Nov. 26, 1940.  F. D. KINNEY  2,223,214
MOUNTING OF BIFOCAL LENS BLANKS
Filed Oct. 30, 1936   4 Sheets-Sheet 1
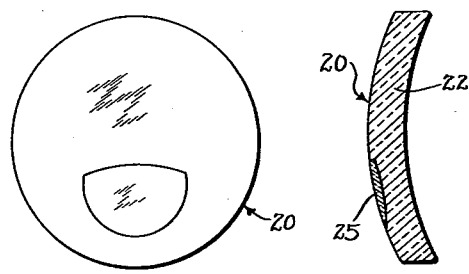
FIG. I   FIG. II
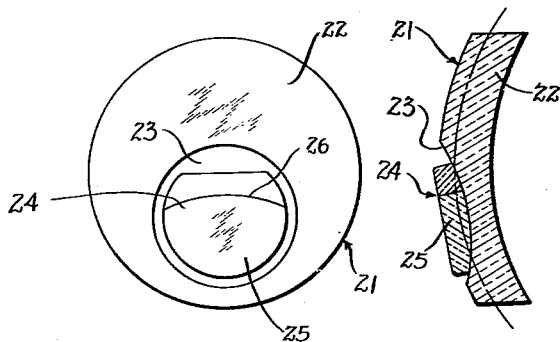
FIG. III   FIG. IV
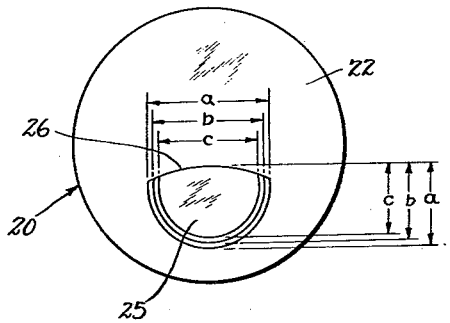
FIG. V
INVENTOR
FAY D. KINNEY
BY
Harry H. Styll
ATTORNEY Nov. 26, 1940.   F. D. KINNEY   2,223,214
MOUNTING OF BIFOCAL LENS BLANKS
Filed Oct. 30, 1936   4 Sheets-Sheet 2
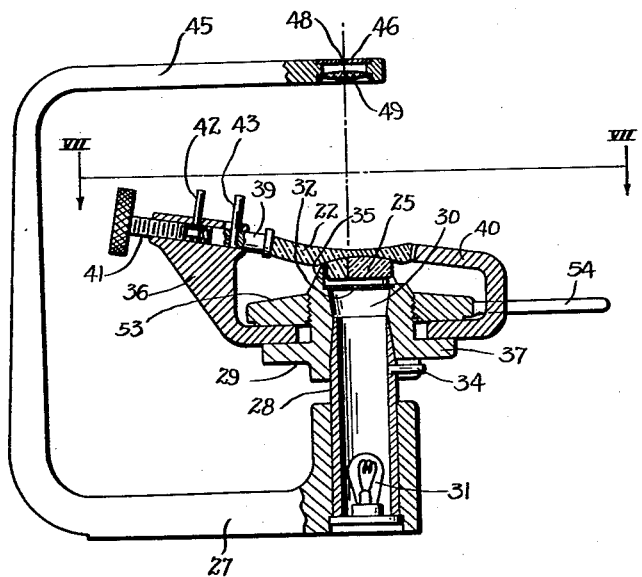
FIG. VI
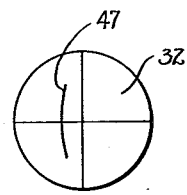
FIG. VIII
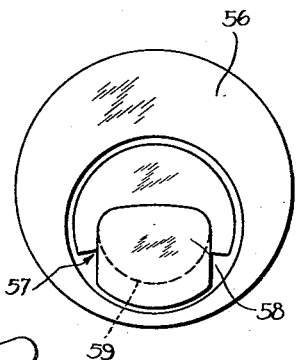
FIG. X
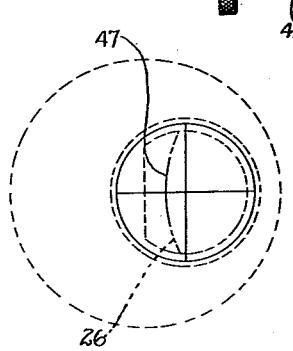
FIG. IX
FIG. VII
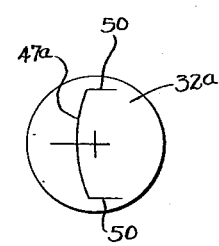
FIG. XI
INVENTOR
FAY D. KINNEY
BY
Harry H. Stull
ATTORNEY Nov. 26, 1940.  F. D. KINNEY  2,223,214
MOUNTING OF BIFOCAL LENS BLANKS
Filed Oct. 30, 1936  4 Sheets-Sheet 3
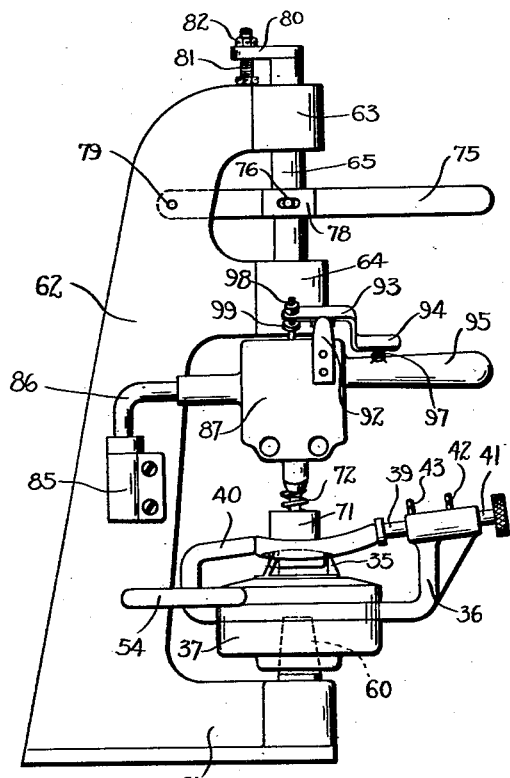
FIG. XII
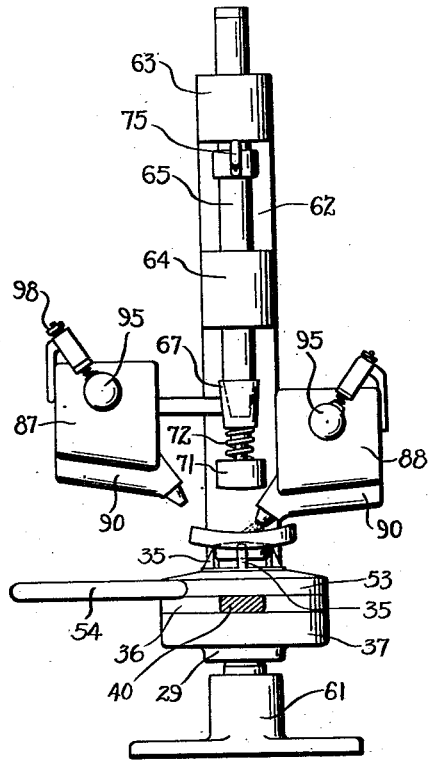
FIG. XIII
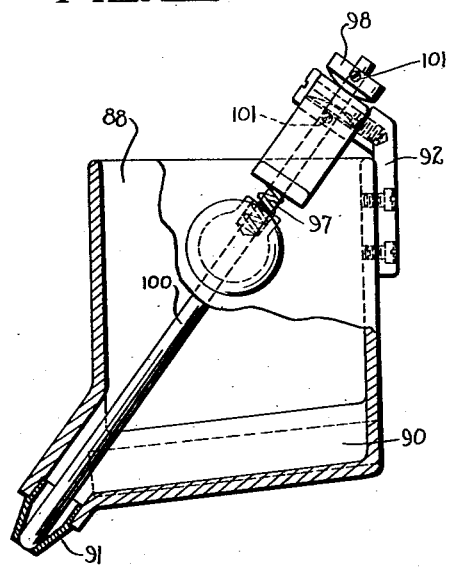
FIG. XV
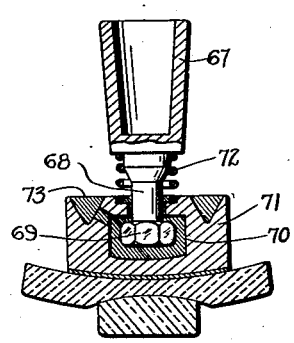
FIG. XIV
INVENTOR
FAY D. KINNEY
BY
Harry H. Styll
ATTORNEY Nov. 26, 1940. F. D. KINNEY 2,223,214
MOUNTING OF BIFOCAL LENS BLANKS
Filed Oct. 30, 1936 4 Sheets-Sheet 4
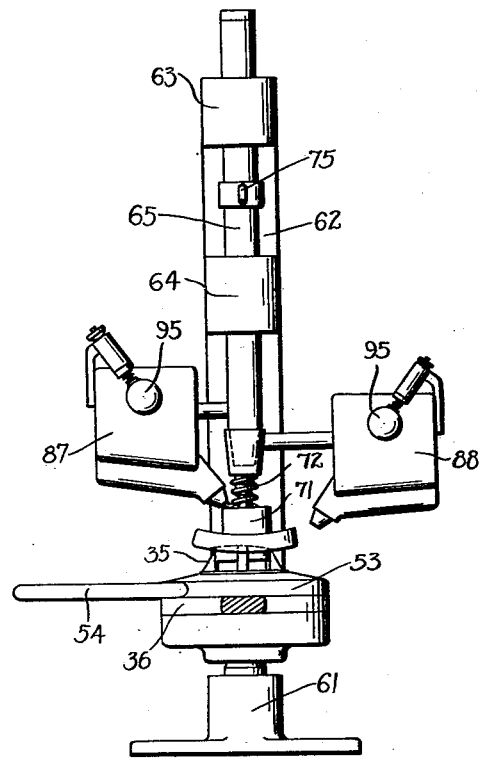
FIG. XVI
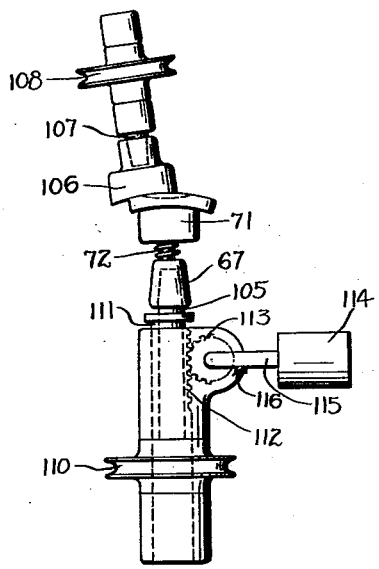
FIG. XVII
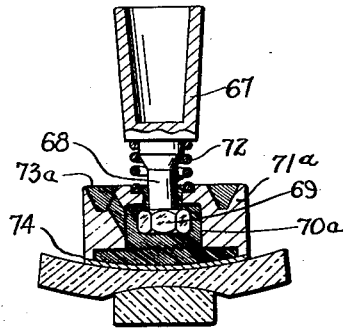
FIG. XVIII
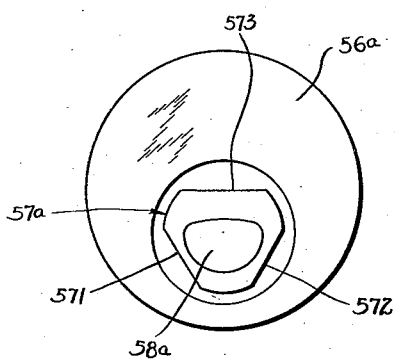
FIG. XIX
INVENTOR
FAY D. KINNEY
BY
Harry H. Styll
ATTORNEY Patented Nov. 26, 1940

2,223,214

UNITED STATES PATENT OFFICE 2,223,214

MOUNTING OF BIFOCAL LENS BLANKS

Fay D. Kinney, Southbridge, Mass., assignor to American Optical Company, Southbridge, Mass., a voluntary association of Massachusetts Application October 30, 1936, Serial No. 108,378

13 Claims. (Cl. 51—277)

This invention relates to the generation of a surface of the proper curvature on a bifocal lens, and more particularly to the mounting of the work-piece in preparation for the grinding and polishing operations.

An object of the invention is to improve the procedure to be followed in mounting the work-piece for the grinding of the segment side so that a segment of correct size and shape may be produced.

A further object of the present invention is to provide improved apparatus for facilitating the proper mounting of the work-piece ready for the grinding and polishing operations.

In the accompanying drawings which illustrate my invention, Figs. I and II are respectively a face view and a view in vertical section through a finished bifocal lens;

Figs. III and IV are corresponding views through a disc having a segment fused thereon;

Fig. V is a diagrammatic plan view of a bifocal lens illustrating the change in area of the segment as grinding proceeds;

Fig. VI is a view principally in central vertical section of my improved blocking holder;

Fig. VII is a plan view of the seat for the lens and the adjustable mechanism for contacting and positioning the lens on this seat, the view being taken on the line 7—7 of Fig. VI;

Fig. VIII is a face view of a glass target employed in centering a lens blank on the seat;

Fig. IX is a diagrammatic view illustrating the relation between the bifocal lens blank and the target of Fig. VIII;

Fig. X is a face view of a bifocal lens blank which must be positioned so as to avoid decrease in width of the segment;

Fig. XI is a face view of a modified form of target suitable for positioning a lens blank such as shown in Fig. X;

Fig. XII is a view in elevation of a lens blocking device;

Fig. XIII is a view in side elevation of this device looking from the right of Fig. XII, part of the adjustable positioning mechanism for the lens being broken away;

Fig. XIV is a sectional view through the lens and lens support, this section being taken on the same axis as that of the spindle of the lens blocking device of Fig. XIII;

Fig. XV is a view partly in side elevation and partly in vertical section on the axis of the needle valve, showing one of the pots of the blocking device of Fig. XIII;

Fig. XVI is a view similar to Fig. XIII, illustrating the step of embedding the lower end of a spindle in a portion of the support for the lens;

Fig. XVII is a diagrammatic view illustrating the subsequent grinding of the lens blank;

Fig. XVIII is a view similar to Fig. XIV showing a modified form of lens support; and Fig. XIX is a view similar to Fig. X showing a modified form of bifocal lens blank.

The present invention is applicable to the production of bifocal lenses of various types, such as Ful-Vue, Panoptik, Kryptok, and others well known in the art.

In the production of such lenses a segment is fused to a major lens blank and the segment side of the blank ground to obtain the proper size and shape of segment. The common practice in grinding away the excess glass of such bifocal lenses at the present time is to control this operation manually. This requires considerable skill, and since trained operators must be paid high wages, the process is a costly one. Moreover, since there is a human factor in this manner of producing bifocal lenses, it is difficult to insure uniform high quality.

Accordingly, an object of my invention is to provide an improved method and apparatus for blocking bifocal lens blanks so that when the segment side of bifocal lenses is finished a segment of more uniform shape and size results, while at the same time the requirements for skill on the part of the operators and for supervision of their work are lessened.

In order to insure that during the process of generating a surface of the proper curvature on the segment side of the lens blank equal amounts of stock shall be removed from each side of the blank segment, I carefully block the blank so that a predetermined center of the segment (which is to be the center of the reading field) is accurately positioned on the axis about which the blank is made to rotate in generating the desired surface, and so that the same axis is normal to the countersink curve and the segment fused thereon.

It will be noted that the positioning of the blank depends upon the countersink curve on which the button is fused and the geometric center of the button, but is not governed by the other features of the blank.

I will give a specific example in connection with Figs. I to V inclusive, the product which it is intended that the grinding and polishing shall produce, namely, a finished bifocal lens 20, being shown in Figs. I and II, and the blank 21 being shown in Figs. III and IV. The blank comprises a major portion 22 having a countersink curve 23 and a composite button 24 fused to the countersink curve 23, this button 24 including a segment 25 of glass which is to constitute the minor portion of the finished bifocal lens.

In a Ful-Vue lens the optical center of the field provided by the segment 25 is 4 millimeters from the dividing line 26 between the major and minor portions of the lens. If the fused blank is blocked in such a position that the predetermined point which is to be this center of the segment accurately coincides with the axis of rotation of the blank during grinding, and that the same axis is normal to the countersink curve 23, then as grinding proceeds the area of the segment will diminish in the manner indicated by the arrows a, b, and c in Fig. V. The important factor is that equal amounts of stock will be removed from each side and from the bottom of the segment 25.

Assuming that the rough segment size is 24 by 16 millimeters, then one millimeter will be removed from each side, and one millimeter will be removed from the depth of the segment, so that in the resulting lens the segment will measure 22 by 15 millimeters.

Furthermore, the process may be so carried out that a segment 2 millimeters smaller is generated, the dimensions 20 by 14 millimeters being a desirable size and proportion for Ful-Vue bifocals.

This procedure overcomes to a large extent the objections to the prior practice due to inherent errors arising out of the eccentric blocking of lens blanks. If the lens blank is so blocked that the predetermined center of its segment 25 is lightly eccentric with respect to the axis of rotation of the blank, and so that the axis on which it rotates during grinding is not normal to the countersink surface 23, the resulting segment is not of the right proportions. This is due to the removal of unequal amounts of stock from the two sides of the segment, resulting in incorrect proportions. It is furthermore possible that under such conditions the depth would also be incorrect.

Under the present practice of controlling the grinding manually, these defects arise so as to throw the segment out of proportion; and it requires skilled manipulation by the operator, by using an eccentric mechanical holder, to correct the error. This is known as a "pulling" operation.

As a means of insuring exact blocking, I have devised a novel blocking holder such as shown in Fig. VI. This holder comprises a base 27 in which is positioned a tubular mounting member 28. The upper portion of this member 28 is tapered to fit within a corresponding recess in the seat 29 for the lens blank. The opening 30 within the seat 29 forms a continuation of the central opening in the tubular member 28; and light from a source 31 in the tubular member 28 passes upwardly through a glass target or screen 32 positioned in the opening 30 and lying beneath the segment 25 of the lens blank when the latter is on the seat 29. A pin 34 projects from the member 28 to enter a recess in the lower rim of the seat 29 to orient the latter ready to receive a lens blank. Three prongs or contacts 35 project upwardly from the seat 29; and the countersink surface 23 of the major lens blank rests on the tips of these contacts 35, so that the lens blank is supported solely on these three tips. The latter are accurately positioned so that as the lens blank is moved about in positioning it relative to the seat 29, the axis of the seat (and mounting member 28) is constantly normal to the countersink surface 23 provided the contacts 35 do not move off the countersink surface 23.

I provide means engageable with the lens blank for adjusting the position of the lens blank on the seat 29 relative to the screen 32. I have illustrated as a preferred embodiment a member 36 supported on top of a flange 37 formed integrally with the seat proper 29. The member 36 carries a spring pressed plunger 39 which engages the rim of the lens blank on one side, and an abutment 40 which engages the rim of the lens blank on the other side. A set screw 41 is provided for increasing or decreasing the tension of the spring which pushes the plunger 39 against the lens blank; and pins 42 and 43, carried respectively by the member 36 and the plunger 39, permit the operator to retract the plunger 39. The abutment 40 positively positions the lens blank relative to the member 36, and the latter may be moved about on the flange 37 to bring the lens blank to the desired position relative to the screen or target 32.

An arm 45 carried by the base 27 supports an eye-piece 46 for assisting in aligning the lens blank with the screen 32. The screen 32 is preferably a glass target which has etched on its face appropriate markings for determining the proper position for the above referred to dividing line 26 and the predetermined center. The target shown in Fig. VIII has crossed lines indicating the proper position for the predetermined center and a curved line 47 of the same radius as the dividing line 26 on the segment and at the proper distance from the predetermined center of the segment.

The eye-piece 46 is provided with a sight hole 48 which is the predetermined distance away from the axis of the seat 29 and directly over the line 47 of the target. The illumination from the source 31 makes the line 47 on the target more pronounced. The manner in which the target assists in properly positioning the lens blank is indicated in Fig. IX, in which the target line 47 has been brought into coincidence with the dividing line 26 of the segment. When this has been accomplished and the segment has been centered on the cross lines the member 36 is clamped to the flange 37 by a nut 53 threaded on the body portion of the seat 29. A lever 54 projects from the nut 53; and when the desired coincidence has been obtained by sliding the member 36 on the flange 37 to the proper position, the lever 54 can be rotated to tighten the nut 53 and clamp the member 36 to the flange 37.

For some types of lenses it is desirable to have in addition to a line 47a for positioning the dividing line on the segment, the end lines 50 at the two ends of the line 47a, as indicated in Fig. XI. Such a target 32a is particularly useful in positioning a bifocal lens of the Panoptik type, such as illustrated in Fig. X, which comprises a major lens blank 56 and a composite button 57 of which the portion 58 is to constitute the minor lens or segment of the bifocal lens. The lines 50 of the target 32a assist in properly positioning the two ends of the segment 58. The extent of the segment after grinding is indicated by the broken line 59.

A target of the type shown in Fig. XI is furthermore of advantage in positioning a bifocal lens blank such as illustrated in Fig. XIX, which comprises a major lens blank 56a and a composite button 57a of which the portion 58a is to constitute the minor lens or segment of the bifocal lens. The lines 50 of the target 32a assist in properly positioning the two ends of the segment 58a. It will be noted that edge portions of the button 57a have been broken away at 571, 572 and 573, so that the three prongs or contacts 35 may engage the countersink surface of the major lens blank 56a.

With the aid of the end lines 50 on the target 32a, the geometric center of the segment is brought into accurate coincidence with the axis of rotation of the blank. The line 47 or the line 47a alone gives quite accurate positioning if the dividing line (such as indicated by 26 in Fig. III) is made to register therewith and the contacts 35 are all three maintained in engagement with the spherical countersink surface (such as indicated by 23 in Fig. III). If the eye of the operator is not true enough to center the segment without the end lines 50, the only inaccuracy which results is the grinding of a slight prism in the segment; and the proportions of the segment will nevertheless be correct if the registry with line 47, as above referred to, is maintained.

With the aid of the screen or target positioned in the opening 30 in the seat 29, the operator has now accurately positioned the lens blank and has clamped the positioning member 36 to the seat proper by means of the nut 53. The seat 29 and the member 36 are now removed as a unit from the tubular mounting member 28 and remounted in the blocking device shown in Figs. XII, XIII, and XVI. A tapered mounting member 60 carried by the base 61 of the device is formed to so fit the recess in the seat 29 as to position the seat on the axis of this device. A standard 62 is carried by the base 61, and this standard provides a pair of bearings 63 and 64 in which a spindle 65 is vertically slidable on the above mentioned axis of the device.

The lower end of the spindle 65 is tapered to fit within a socket member 67 from whose lower end extends a stem 68 terminating in a head 69. This head may be in the form of a hex nut threaded on to the lower end of the stem 68. The head 69 is received within a recess or chamber 70 in a lens support 71. A compression spring 72 coiled about the stem 68 and extending between the socket member 67 and the lens support 71 urges the latter away from the socket member so as to tend to withdraw the stem 68 from the lens support 71. The opening in the lens support 71 through which the stem 68 extends is large enough so that there is no binding, and the lens support is free to move and take its proper position in engagement with the lens blank. A lateral duct 73 is provided in the lens support 71 through which a molten substance such as low melting point metal or metallic alloy may be poured, as will be later explained.

A modified form of lens support 71a is illustrated in Fig. XVIII. The duct 73a leads into a central chamber 70a which is not only large enough to freely accommodate the head 69 on the stem 68, but furthermore opens through the bottom of the lens support, so that molten metal poured in through the duct 73a forms the central portion of the support for the lens blank. This opening is surrounded by the lower rim portion 74 of the lens support.

The spindle 65 is raised and lowered by means of a lever 75 connected to the spindle by laterally extending pins 76 on the spindle which engage in slots in a yoke portion 78 of the lever 75. The lever is pivoted to the standard 62 at 79. A lateral arm 80 at the top of the spindle carries a set screw 81 with lock nut 82. The head of the set screw is adapted to engage the top of the standard 62 to limit downward movement of the spindle 65. On the standard 62 are mounted, by means of brackets 85, two swinging supports 86, one carrying an electrically heated receptacle or pot 87 for the molten substance such as the low melting point alloy above referred to, and the other carrying an electrically heated receptacle or pot 88 for depositing cement or other adhesive material on the top surface of the lens blank. The two receptacles 87 and 88 are substantially alike, and therefore description of the receptacle 88 in connection with the sectional view of it in Fig. XV will suffice for the two.

The receptacle proper is provided with a central trough 90, into which the rest of the material in the receptacle will drain; and this trough slopes to an outlet 91, which is preferably of a hard, heat resisting material, such as stainless steel. A bracket 92 on the opposite side of the receptacle from the outlet 91 pivotally supports a lever 93 which has a thumb rest 94 in convenient relation to a handle 95 on the pot 88, so that the operator in grasping the handle 95 for swinging the receptacle, may rest his thumb on the rest 94. The handle 95 on the receptacle extends forwardly so as to be readily grasped by the operator. A coil spring 97 interposed between the thumb rest 94 and the handle 95 urges the rest away from the handle. Each receptacle is so mounted that it can be swung conveniently into position (compare Figs. XIII and XVI for discharging cement or molten metal according to requirements).

The other end of the lever 93 is connected by adjustable abutments 98 and 99 to the upper end of the rod 100, which acts as a needle valve within the outlet 91. Set screws 101 provide for the adjustments of the abutments 98 and 99, and the latter are rounded so as to avoid binding against the lever 93 as it is swung about its pivot.

So far as I am aware, the subject matter of the present application involves not only novel principles of construction of a lens blocking device, but also a novel procedure for mounting a lens blank on a support in preparation for grinding.

In the common method of mounting a lens blank, the latter rests upon a mass of pitch of sufficient thickness to allow when plastic for the precise setting of the lens blank. According to my teaching a lens support floats relative to the spindle which carries it, until the lens support has conformed in position to the surface of the lens blank, and a plastic substance is provided for fixing the lens support in the position which has thus been determined. Suitable adhesive material such as pitch may be employed to cause the lens blank to stick to the lens support. In other words, the blocking may be considered to be a step removed from the lens blank itself, and that it is the lens support which is blocked instead of the lens blank itself. Since the lens blank has already been accurately positioned and centered relative to the axis about which the blank is to rotate during grinding and polishing, the plastic substance above mentioned permits the lens support to take a position which is determined by the lens blank rather than vice versa, and when the plastic substance hardens, the lens blank is fixedly mounted on the desired axis. This is brought out more clearly by a statement of the method by which is followed in accordance with the present invention in mounting a lens.

The lens blank is accurately positioned on a seat 29. According to the broader aspects of my invention, it is immaterial whether such accurate positioning be accomplished by means of a separate instrumentality, or while the seat is mounted on the blocking device itself. With the apparatus disclosed in the drawings I have found that more accurate results are obtained by employing the blocking holder illustrated in Fig. VI, for positioning the lens blank as a preliminary operation.

With the lens blank accurately positioned on its seat, the lens support is capable of assuming a position in conformity therewith because of the loose fit of the stem 68 and head 69 in the support 71 or 71a. With the bottom surface of the support 71, or the bottom of the rim 74 of the support 71a lying against the lens blank under pressure from the lever 75 transmitted through the spring 72, the operator fills the chamber 70 or 70a with the fluid material from the receptacle 87 through the duct 73 or 73a. The support 71 is particularly useful where a large number of lenses are to be mounted having a surface of the same curvature. Thus the bottom of the support may be given this curvature, and if an application of adhesive material such as pitch is made from the receptacle 88 on the upper surface of the work-piece before the support 71 is lowered, the work-piece is affixed to the support under the pressure of the spring 72 while the head 69 is being embedded in the material poured into chamber 70.

The support 71a provides automatic reforming of its contour to correspond to tht curvature of the lens blank being blocked, inasmuch as the central portion of the bottom surface of the support is not permanent in character, but is filled in each time as will now be explained.

A coating of adhesive material is applied to the upper surface of the lens blank, a suitable material being a mixture of guncotton and the synthetic resin sold under the trade name Binsol in suitable solvents and/or plasticizing agents. I prefer to use a mixture of guncotton, Binsol, alcohol, dibutyl phthalate, and toluene. Against the adhesive coated surface of the work-piece is pressed the rim 74 of the support 71a. As the lens blank is accurately positioned on its seat, it is in the proper relation to the axis of the spindle 65 as the latter is lowered by bringing the lever 75 down; and the floating connection of the support 71a to the spindle 65 permits the rim 74 to take the alignment of the upper surface of the blank. The operator next brings the outlet of the receptacle 87 into alignment with the duct 73a and fills the recess 70a with the fluid material from that receptacle in the manner illustrated in Fig. XVI. The fluid material is preferably molten metal or a molten metallic alloy, such as Rose metal containing as ingredients lead, tin and cadmium and having a melting point of 165° F. Upon solidification, this material embeds the head 69 within the recess 70, or 70a of the support 71 or 71a as the case may be. This of course effects the rigid mounting of the lens blank on the socket member 67 in the desired relation to the axis of the latter. The tightening screw 41 may now be released and the spindle 65 raised, carrying with it the support and the lens blank firmly attached to it.

The subsequent grinding operation, which is diagrammatically illustrated in Fig. XVII, can be carried out in the usual manner. A rotatable taper spindle 105 fits the socket in the member 67; and the lens blank is of course thus mounted in the proper relation to the axis of rotation of the spindle 105. A generating lap 106 of standard construction is mounted to rotate with an upper spindle 107 which may be driven by a pulley 108. The generating lap 106 will, as is customary, rotate in the opposite direction from the work-piece, that is, the lens blank. The latter is rotated by means of a pulley 110 which drives the taper spindle 105. The latter is surrounded by a non-rotating sleeve 111, which is so connected to the spindle 105 as to cause the latter to follow the axial movements of the sleeve 111. This can of course be effected by providing collars on the spindle 105 against which the sleeve 111 may abut. The sleeve 111 is urged upwardly by having rack teeth 112 thereon with which a pinion 113 meshes. A weight 114 on a lever arm 115 which is connected to the gear 113 tends to lift the sleeve 111, and therefore the taper spindle 105.

The weight 114 lowers as grinding continues, and the excess stock is removed evenly so that the segment is reduced in the manner indicated by the successive steps a, b, and c of Fig. V. An adjustable stop 116 permits the operator to predetermine the amount of glass removed so that the grinding operation is to a considerable extent automatically controlled. This is made possible in the first place by the accurate blocking of the lens blank so that an even amount of glass is removed from all portions of the segment. Such automatic control is furthermore made possible by the arrangement which makes it possible to block the blank to a predetermined height. In other words, the stop 81 determines the exact position of the socket member 67 with relation to the side of the lens blank on which the segment is fused. This relation is always the same, since the stop 81 and the seat 29 for the lens blank bear a constant predetermined relation, and any inequalities in the lens blank are taken up in the process of embedding the head 69 in the recess 70 in the lens support 71 or 71a.

The principal advantage of the present invention is that it makes it possible to produce a segment of more uniform shape and size with a minimum amount of effort and supervision, the need for highly skilled labor being eliminated. The invention makes it a comparatively easy matter to block the lens blank so that the predetermined center of the segment is positioned concentrically on the axis upon which the blank will rotate during subsequent grinding and so that that axis will be normal to the countersink curve on which the segment is fused. As a result the invention affords the distinct advantage that the segment is proportionately reduced in size on both sides and on the bottom, resulting in a segment of correct size and shape.

Important advantages of my invention arise through the use of the socket member 67 and head 69. This novel construction with the floating connection provides for accommodating the lens support to blanks which are prismatic and of variable thickness. This construction moreover has the advantage that the operator may block these blanks to a fixed height measured from the skirt of the recessed member 67 to the countersink curve 23, this height being independent of prism or thickness of blank. Without such an arrangement for blocking the bifocal lens blank to a predetermined height, it would be impractical to grind the bifocal side of the blank to a fixed stop 116 on the curve generating machine.

I find the resilient mounting of the support 70 or 70a to be advantageous, since the spring 72 provides pressure against the support at all times, and provides sufficient yielding to take care of inequalities in the glass of the blank. The spring pressure also forces the support surface against the blank in the process of cementing without danger of breakage.

Since the structures disclosed and shown in the drawings are for purposes of illustration only, and since the steps of the method as described for mounting a blank in preparation for generating a surface thereon need not be followed rigorously and in particular may be varied as to sequence, it will be understood that the invention may be otherwise embodied and practised within the scope of the following claims, and it will furthermore be understood that no method claim is limited to the sequence in which the steps are stated therein unless specifically required by that claim.

I claim:

1. In a method of blocking a bifocal lens blank in preparation for generating a surface on the segment side thereof, the steps consisting in supporting a lens blank by a support engaging the countersink curve of the blank, aligning a point at which the optical center of the segment is to be located with the axis of rotation of a two-part block adapted to be rotatably mounted for generating the desired surface on the segment side of the blank, attaching one part of said block to the opposite side of the blank and rigidly uniting the parts of said block while maintaining said support in engagement with the countersink curve of the blank and the axis of rotation of the two-part block in alignment with the point at which the optical center of the segment is to be located.

2. In a method of blocking a bifocal lens blank in preparation for generating a surface on the segment side thereof, the steps consisting in supporting a bifocal lens blank by a support having contacts for engaging the countersink curve of the blank, adjusting the position of the blank on said contacts so as to align a point at which the optical center of the segment is to be located with the axis of rotation of a two-part block adapted to be rotatably mounted for generating the desired surface on the segment side of the blank, attaching one part of said two-part block to the side of the blank opposite the segment and rigidly uniting the parts of said block while yieldably urging the attached part of said block and the blank toward said contacts and while maintaining the axis of the other part of said block in alignment with the point at which the optical center of the segment is to be located.

3. A method of blocking a lens blank in preparation for generating a surface thereon comprising locating and holding the lens blank in desired angular and centering position with respect to the axis about which it rotates during surface generation, applying adhesive material to the surface of the lens blank opposite that to be generated, yieldably pressing one end of a hollow support member, adapted to loosely receive an end portion of a spindle member in its other end, against said opposite surface so as to cause said hollow support member to conform to said angular position of said lens blank, and embedding said spindle end portion in said hollow support member by pouring molten material into said hollow portion on said lens blank and permitting said molten material to solidify by cooling whereby said spindle member and said hollow support member achieve the same angular relation as exists between said lens blank and said surface generation axis of rotation.

4. A blocking device comprising a supporting member, a lens block loosely connected to said supporting member having a surface for adhering to a surface of a lens blank, said supporting member being movable to advance said lens block along a given axis about which the block is adapted to be rotated during the abrading of the blank, an aligning device having a seat for receiving the lens blank, said seat having centering means for locating a predetermined point on the blank on the center of said seat, means for mounting said aligning device on said blocking device with the center of said seat in axial alignment with the longitudinal axis of the support carrying the lens block with the movement of said support and block towards the lens blank along said longitudinal axis being adapted to move the block into engagement with the lens blank to cause said block to tilt into conformity with the engaged surface of the blank through its loose connection with its support, and means for securing the block to the lens in said relation and for also securing the block in rigid relation with its support.

5. A lens blocking device comprising a lens block, means for advancing said block along the axis about which it rotates during surface generation, a holder having a seat for a lens blank thereon, said holder having an opening and a target screen in said opening and a portion for gripping said lens blank adapted to be moved with said lens blank whereby a predetermined point on the lens blank may be located in registry with the center of said target screen, means for mounting said holder and said predetermined point on said blank in axial alignment with the longitudinal axis of the lens block advancing means, said holder being capable of being removed from its mounting means and returned to and interfitted therewith so as to restore said alignment of said holder with the axis of said advancing means.

6. A lens blocking device comprising a support having a member reciprocally mounted thereon, a lens block connected to said member by a universal connection including yielding means, said reciprocally mounted member and block being movable along an axis about which the block is to be rotated during surface generation, an aligning device having a seat for receiving said lens blank, said aligning device having centering means whereby a predetermined point on said lens blank may be centered with said centering means to rotate the blank in desired relation with said seat and means for retaining said blank in said relation and means for mounting said seat and the lens blank carried thereby in axial alignment with the reciprocal member to be engaged by said lens block with the predetermined point of the lens blank in axial alignment with the longitudinal axis of the reciprocal member.

7. A lens blocking device comprising means for locating and holding a lens blank in predetermined position, a member having a portion movable in a controlled direction, a lens block mounted on said movable portion by a connection permitting tilting of the lens block relative thereto and being movable about an axis substantially normal to the plane of the lens blank to bring said block into engagement with said lens blank to cause said block to tilt into conformity with the surface of said blank and means for applying molten material to said connection which material upon hardening fixes the block against movement relative to said member.

8. A lens blocking device comprising means for supporting a lens blank in a given position, a support mounted on said device for movement toward and away from said lens blank along an axis passing through a predetermined point on said blank about which the blank is to be rotated during abrading, said support having a lens block loosely connected thereto and adapted to be moved by said support into engagement with the blank so as to cause it to tilt into conformity with the engaged surface of the blank, and means for securing said blank to said block and means for fixing said lens block against tilting movement relative to its support.

9. A method of positioning and fixing a work piece on a two-part support in preparation for generating a surface thereon comprising attaching the work piece to one part of said support by means fixing it against movement relative to said part while maintaining the other part in freedom of movement angularly relative to the work piece, adjusting said other part to desired angular relation with said work piece and fixing the parts of said support together in said adjusted position by embedding a portion of one of the parts in a low melting point substance carried by the other part.

10. A method of blocking a lens blank in prepartion for generating a surface thereon comprising accurately positioning the lens blank in desired relation to the axis of a lens block support adapted to be rotated for generating a surface on the said lens blank, effecting relative movement between the lens blank and said support so as to cause the lens block carried by said support to conform to the surface of the lens blank without changing the relation between the lens blank and said axis, making the lens block rigid with the lens blank while the latter is accurately positioned, and rigidly connecting said lens block to said support, also without changing the relation between the lens blank and said axis.

11. A lens blocking device for blocking a lens having a countersink recess and a projecting portion, said blocking device comprising a holder having a seat with a recess for receiving the projecting portion of the blank with the countersink surface engaging said seat, a target screen in said recess, means engageable with the lens blank adjacent the periphery thereof for adjusting the position of said blank on said seat and means for clamping said means engageable with the lens blank in adjusted position and an eyepiece arranged to focus on said screen so as to aid in adjusting said lens blank to desired aligned position relative to said target screen.

12. A method of blocking a lens blank in preparation for generating a surface thereon comprising positioning the lens blank in desired relation to the axis of a lens block support adapted to be rotated for generating a surface on said lens blank and on which a lens block is yieldably supported, causing the lens block to tilt relative to said support into conformity to the surface of the lens blank with which it engages, fixing said block to the lens blank by means of an interposed layer of adhesive, and rendering the connection between the lens block and its support rigid while maintaining the said predetermined relation between the axis of said support and the lens blank.

13. A method as claimed in claim 12 in which the connection between the lens block and its support is made rigid by introducing heat softened material and permitting said material to cool and harden.

FAY D. KINNEY.